(12) United States Patent
Baba

(10) Patent No.: US 11,268,862 B2
(45) Date of Patent: Mar. 8, 2022

(54) TEMPERATURE SENSOR AND DEVICE PROVIDED WITH TEMPERATURE SENSOR

(71) Applicant: SEMITEC Corporation, Tokyo (JP)

(72) Inventor: Takehiro Baba, Tokyo (JP)

(73) Assignee: SEMITEC Corporation, Tokyo (JP)

( * ) Notice: Subject to any disclaimer, the term of this patent is extended or adjusted under 35 U.S.C. 154(b) by 453 days.

(21) Appl. No.: 16/309,461

(22) PCT Filed: Jun. 14, 2017

(86) PCT No.: PCT/JP2017/021930
§ 371 (c)(1),
(2) Date: Dec. 13, 2018

(87) PCT Pub. No.: WO2018/003497
PCT Pub. Date: Jan. 4, 2018

(65) Prior Publication Data
US 2019/0187002 A1    Jun. 20, 2019

(30) Foreign Application Priority Data
Jun. 30, 2016   (JP) .............................. JP2016-130025

(51) Int. Cl.
*G01K 1/08*    (2021.01)
*G01K 7/22*    (2006.01)
*H01C 1/028*   (2006.01)

(52) U.S. Cl.
CPC ................. *G01K 1/08* (2013.01); *G01K 7/22* (2013.01); *H01C 1/028* (2013.01)

(58) Field of Classification Search
None
See application file for complete search history.

(56) References Cited

U.S. PATENT DOCUMENTS

2004/0141545 A1* 7/2004 Hoshisashi ............ G01K 13/02
374/208
2007/0066796 A1* 3/2007 Akiba .................. C09D 179/08
528/353

(Continued)

FOREIGN PATENT DOCUMENTS

CN    1508516    6/2004
CN    106133490   11/2016

(Continued)

OTHER PUBLICATIONS

"International Search Report (Form PCT/ISA/210)" of PCT/JP2017/021930, dated Sep. 19, 2017, with English translation thereof, pp. 1-4.

(Continued)

*Primary Examiner* — Erica S Lin
(74) *Attorney, Agent, or Firm* — JCIPRNET

(57) ABSTRACT

The purpose of the present invention is to provide: a temperature sensor able not only to prevent failures where a temperature-sensitive sintered body ends up coming out of a protective case together with a packing resin, but also to curb changes in properties of the temperature-sensitive sintered body and ensure reliability; and a device provided with this temperature sensor. A temperature sensor (1) is provided with: a protective case (2) that has a linear expansion coefficient of 7.5 to $19.5 \times 10^{-6}/°$ C.; a temperature-sensitive sintered body (3) that is arranged inside the protective case (2); a lead wire (4) that is connected to the temperature-sensitive sintered body (3) and has a cross-sectional area of 0.097 $mm^2$ or less; and a packing resin (6) that has a linear expansion coefficient of 7.5 to $19.5 \times 10^{-6}/°$ C. and that is packed around the temperature-sensitive sintered body (3) inside the protective case (2).

7 Claims, 3 Drawing Sheets

(56) References Cited

U.S. PATENT DOCUMENTS

| | | | | |
|---|---|---|---|---|
| 2009/0316752 | A1* | 12/2009 | Kawase | G01K 7/223 |
| | | | | 374/183 |
| 2012/0063488 | A1* | 3/2012 | Nakayama | G01K 7/24 |
| | | | | 374/185 |
| 2014/0196538 | A1* | 7/2014 | Sato | G01F 23/14 |
| | | | | 73/299 |

FOREIGN PATENT DOCUMENTS

| | | |
|---|---|---|
| CN | 205789349 | 12/2016 |
| JP | H0575629 | 10/1993 |
| JP | H0637729 | 5/1994 |
| JP | H0854291 | 2/1996 |
| JP | 2566613 | 3/1998 |
| JP | 2003240642 | 8/2003 |
| JP | 2005017088 | 1/2005 |
| JP | 2005024344 | 1/2005 |
| JP | 2012211792 | 11/2012 |
| JP | 5530313 | 6/2014 |

OTHER PUBLICATIONS

Office Action of China Counterpart Application, with English translation thereof, dated Apr. 3, 2020, pp. 1-10.
"Office Action of China Counterpart Application", dated Dec. 10, 2020, with English translation thereof, pp.1-14.
Office Action of China Counterpart Application, with English translation thereof, dated Jun. 22, 2021, pp. 1-10.
"Office Action of China Counterpart Application", dated Dec. 30, 2021, with English translation thereof, p. 1-p. 11.

* cited by examiner

Evaluation Result

| Sample No. | Thermistor — Thermistor composition | Thermistor — Linear expansion coefficient ×10⁻⁶/°C | Thermistor — Lead wire | Thermistor — Lead wire Linear expansion coefficient ×10⁻⁶/°C | Sealing material | Sealing material Linear expansion coefficient ×10⁻⁶/°C | Packing resin (Epoxy resin) | Packing resin Linear expansion coefficient ×10⁻⁶/°C | Protective case (Bottomed pipe) | Protective case Linear expansion coefficient ×10⁻⁶/°C | −30⇌150°C Cycle test (number of cycles) 100 ΔR(%) | 1,000 ΔR(%) | 5,000 ΔR(%) | Appearance |
|---|---|---|---|---|---|---|---|---|---|---|---|---|---|---|
| 1 | Ceramic | 10 | Dumet φ0.2 | 9 | Glass | 8.8 | Hard | 13 | Copper | 16.8 | ±0 | ±0.03 | ±0.05 | ○ |
| 2 | Ceramic | 10 | Dumet φ0.2 | 9 | Glass | 8.8 | Hard | 34 | PPS | 11.0 | ±0 | ±0.02 | ±0.1 | × The case had cracks at 5000 cycles. |
| 3 | Ceramic | 10 | Dumet φ0.2 | 9 | Glass | 8.8 | Hard | 13 | PPS | 11.0 | ±0 | ±0.03 | ±0.1 | ○ |
| 4 | Ceramic | 10 | Dumet φ0.2 | 9 | Glass | 8.8 | Hard | 27 | Aluminum | 23.0 | ±0 | ±0.02 | ±0.04 | ○ |
| 5 | Ceramic | 10 | Dumet φ0.2 | 9 | Glass | 8.8 | Hard | 13 | Aluminum | 23.0 | ±0 | ±0.03 | ±0.02 | ○ |
| 6 | Ceramic | 10 | 42 alloy □0.25 | 5 | Epoxy | 40 | Hard | 13 | Copper | 16.8 | ±0 | ±0.01 | ±0.04 | ○ |
| 7 | Ceramic | 10 | 42 alloy □0.5 | 5 | Epoxy | 40 | Flexible | 160 | Copper | 16.8 | ±0 | ±0.1 | ±0.42 | ○ |
| 8 | Ceramic | 10 | 42 alloy □0.5 | 5 | Epoxy | 40 | Hard | 34 | Copper | 16.8 | ±0 | ±0.1 | ±0.2 | × Coming out of the pipe at 100 cycles |
| 9 | Ceramic | 10 | 42 alloy □0.5 | 5 | Epoxy | 40 | Flexible | 160 | Copper | 16.8 | ±0 | ±0.03 | ±0.45 | × Coming out of the pipe at 1000 cycles |

FIG. 5

TEMPERATURE SENSOR AND DEVICE PROVIDED WITH TEMPERATURE SENSOR

CROSS-REFERENCE TO RELATED APPLICATION

This application is a 371 application of the International PCT application serial no. PCT/JP2017/021930, filed on Jun. 14, 2017, which claims the priority benefit of Japan Patent Application No. 2016-130025, filed on Jun. 30, 2016. The entirety of each of the above-mentioned patent applications is hereby incorporated by reference herein and made a part of this specification.

BACKGROUND

Technical Field

The disclosure relates to a temperature sensor having good durability against heat cycles and a device provided with the temperature sensor.

Description of Related Art

The thermistor temperature sensor that adopts a temperature-sensitive sintered body as the temperature sensing element has been used, for example, to detect the temperatures of household electrical appliances such as air conditioners, refrigerators, and water heaters, or in-vehicle equipment for automobiles, etc. Since such a temperature sensor is used in severe temperature environments where the temperature always changes, it is required to have durability against heat cycles.

Therefore, conventionally a temperature sensor has been proposed, which improves not only heat cycle resistance but also water resistance and heat responsiveness. Specifically, the configuration is formed by disposing a lead wire connected via an electrode disposed on the surface of the temperature-sensitive sintered body inside a bottomed pipe-shaped protective case, and packing a packing resin around the temperature-sensitive sintered body in the protective case. This configuration prevents the failure that the packing resin may peel off from the protective case against heat cycles and come out of the protective case together with the temperature-sensitive sintered body.

RELATED ART

Patent Document

[Patent Document 1] Japanese Utility Model Laid-Open No. H5-75629
[Patent Document 2] Japanese Utility Model Laid-Open No. H6-37729
[Patent Document 3] Japanese Patent No. 5530313
[Patent Document 4] Utility Model Registration No. 2566613
[Patent Document 5] Japanese Patent Application Laid-Open No. 2003-240642

SUMMARY

Problems to be Solved

However, while the conventional temperature sensor described above focuses on preventing the failure that the temperature-sensitive sintered body may come out of the protective case together with the packing resin, it does not pay attention to changes in the properties, that is, the resistance value, of the temperature-sensitive sintered body with respect to heat cycles.

The purpose of the disclosure is to provide a temperature sensor that can not only prevent the failure that the temperature-sensitive sintered body comes out of the protective case together with the packing resin but also curb changes in the properties of the temperature-sensitive sintered body and ensure reliability, and provide a device provided with the temperature sensor.

Means for Solving the Problems

A temperature sensor of the disclosure is characterized in including: a protective case having a linear expansion coefficient of 7.5 to $19.5 \times 10^{-6}/°$ C.; a temperature-sensitive sintered body disposed in the protective case; a lead wire connected to the temperature-sensitive sintered body and having a cross-sectional area of 0.097 mm$^2$ or less; and a packing resin packed around the temperature-sensitive sintered body in the protective case and having a linear expansion coefficient of 7.5 to $19.5 \times 10^{-6}/°$ C. The temperature sensor of the disclosure is characterized in that, a material of the protective case is resin or metal.

The temperature sensor of the disclosure is characterized in that, the material of the protective case is resin and is PPS (polyphenylene sulfide), liquid crystal polymer, PAI (polyimide-imide), or PEI (polyetherimide).

The temperature sensor of the disclosure is characterized in that, the material of the protective case is resin and includes a filler for improving heat conductivity.

The usual resin case has the disadvantage that the thermal time constant of the temperature sensor is delayed, but by using a resin that includes a filler for improving heat conductivity, the time constant can be made faster.

The temperature sensor of the disclosure is characterized in that, the protective case is plated with metal. The metal plating improves water resistance and oil resistance.

The temperature sensor of the disclosure is characterized in that, the material of the protective case is metal and is copper (Cu), iron (Fe), chromium (Cr), nickel (Ni), aluminum (Al), zinc (Zn), titanium (Ti), or an alloy including at least one of these. A copper nickel alloy, a copper nickel zinc alloy, an iron chromium alloy or the like can be used as the optimum alloy. The metal case improves water resistance and oil resistance.

The temperature sensor of the disclosure is characterized in that, the lead wire is copper (Cu), iron (Fe), chromium (Cr), nickel (Ni), aluminum (Al), zinc (Zn), titanium (Ti), or an alloy including at least one of these. Any form of lead wire, such as a single wire, a square wire, a stranded wire or the like, can be used.

The temperature sensor of the disclosure is characterized in that, the packing resin is an acid anhydride-based epoxy resin including a filler. For example, ceramic, metal, carbon, etc. having good heat conductivity can be used as the filler.

The temperature sensor of the disclosure is characterized in that, the lead wire is a stranded wire and is configured as a core wire of an electric wire applied with an insulating coating. The temperature sensor of the disclosure is characterized in that, the insulating coating of the electric wire is a double coating. By using a double coating wire, it is possible to obtain insulation properties and tensile strength sufficient for practical use even if the core wire of the electric wire is thin. A device provided with a temperature sensor of the disclosure is characterized in including the temperature sensor of the disclosure.

The device provided with the temperature sensor corresponds to various devices that include a temperature sensor for detecting the temperatures of household electrical appliances such as air conditioners, refrigerators, and water heaters, or in-vehicle equipment for automobiles, etc. Devices to which the temperature sensor is applied are not particularly limited.

Effects

According to the embodiments of the disclosure, it is possible to provide a temperature sensor that can not only prevent the failure that the temperature-sensitive sintered body comes out of the protective case together with the packing resin but also curb changes in the properties of the temperature-sensitive sintered body and ensure reliability, and provide a device provided with the temperature sensor.

BRIEF DESCRIPTION OF THE DRAWINGS

FIG. 5 is a table showing the evaluation results obtained by performing a heat cycle test on temperature sensor of the disclosure.

DESCRIPTION OF THE EMBODIMENTS

Figure 1:
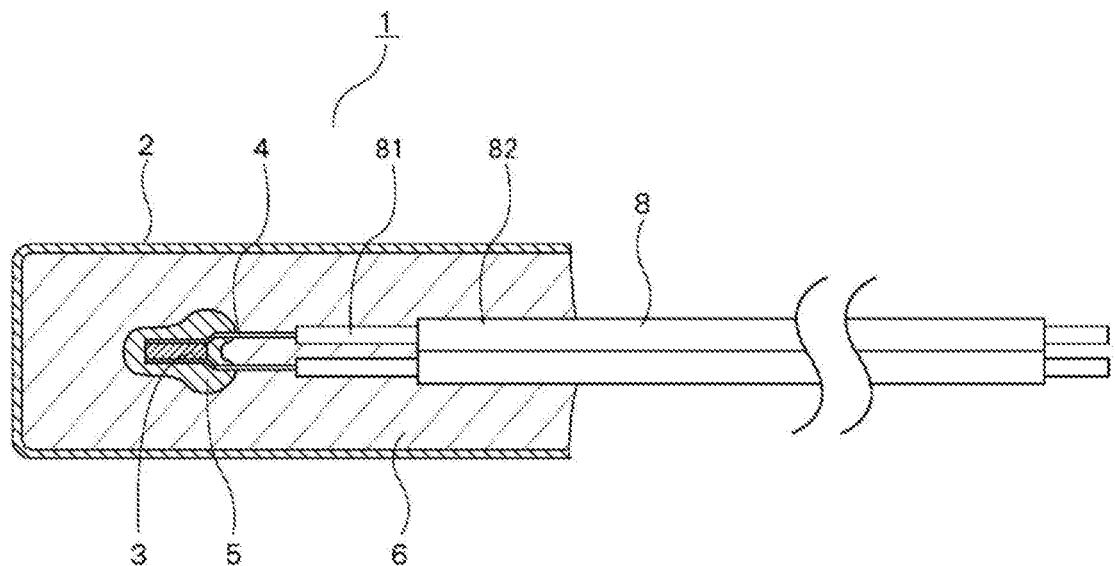
FIG. 1 is a cross-sectional view showing the temperature sensor according to the first embodiment of the disclosure.

Hereinafter, the temperature sensors according to the embodiments of the disclosure will be described with reference to FIG. 1 to FIG. 5. FIG. 1, FIG. 2, FIG. 3, and FIG. 4 are cross-sectional views showing the temperature sensors of the first to fourth embodiments, and FIG. 5 is a table showing the evaluation results obtained by performing a heat cycle test. In the drawings, the same or corresponding portions are denoted by the same reference numerals and descriptions thereof are not repeated.

First Embodiment

As shown in FIG. 1, the temperature sensor 1 is a thermistor having a temperature sensing function and includes a protective case 2, a temperature-sensitive sintered body 3 that is a thermistor sintered body, a lead wire 4, a sealing material 5, and a packing resin 6. The temperature-sensitive sintered body 3, which is connected with the lead wire 4 and sealed with the sealing material 5, is disposed in the protective case 2, and the packing resin 6 is packed around the temperature-sensitive sintered body 3.

The protective case 2 is made of a resin or a metallic material, has a bottomed pipe shape with one end opened, and is formed in a cylindrical shape or a quadrangular tubular shape. Generally, a case having a cylindrical shape and having an outer diameter of 6 to 8 mm and a length of 20 to 30 mm is selected.

In the case where the material of the protective case 2 is a resin, it is preferable to use a highly heat-resistant resin such as PPS (polyphenylene sulfide), liquid crystal polymer, PAI (polyamide-imide), and PEI (polyetherimide), which can ensure heat resistance of 150° C. Moreover, in the case where the material of the protective case 2 is a metal, copper (Cu), iron (Fe), chromium (Cr), nickel (Ni), aluminum (Al), zinc (Zn), titanium (Ti), or an alloy including at least one of these can be used.

Further, in the case where the material of the protective case 2 is a resin, it is desirable to apply plating of the above-mentioned metal, that is, copper (Cu), iron (Fe), chromium (Cr), nickel (Ni), aluminum (Al), zinc (Zn), titanium (Ti), or an alloy including at least one of these, on the resin protective case 2. In addition, fillers such as ceramic, metal, and carbon having good heat conductivity may be mixed and dispersed in the resin protective case 2. Without the fillers mixed and dispersed therein, the thermal time constant is 15.1 seconds, but when a resin with the fillers mixed and dispersed therein is used, the thermal time constant becomes 11.5 seconds and the responsiveness can be improved about 30%. In addition, by applying metal plating on the resin case, the water resistance and oil resistance of the temperature sensor 1 can be improved.

The temperature-sensitive sintered body 3 is formed in a substantially rectangular parallelepiped shape, and is composed of an oxide thermistor material that includes a complex metal oxide having a crystal structure and being composed of two or more elements selected from transition metal elements such as manganese (Mn), nickel (Ni), cobalt (Co), iron (Fe), yttrium (Y), chromium (Cr), copper (Cu), and zinc (Zn) as the main component. Besides, auxiliary components may be included for improving the properties or the like. The composition and contents of the main component and the auxiliary components can be determined as appropriate according to the desired properties.

Further, the temperature-sensitive sintered body 3 may be composed of silicon (Si) based ceramic such as silicon carbide (SiC) and silicon nitride ($Si_3N_4$). In addition, the temperature-sensitive sintered body 3 does not necessarily have a substantially rectangular parallelepiped shape and may have a disc shape, a polygonal shape, etc., which can be selected as appropriate.

The lead wire 4 is electrically conductive, and is electrically connected to an electrode of gold, silver, copper, platinum, etc. formed on the surface of the temperature-sensitive sintered body 3 by welding or soldering and is led out from an opening on one end side of the protective case 2. The lead wire 4 is electrically connected to each core wire 81 of an electric wire 8 by soldering or the like and is applied with an insulating coating 82 to be insulated.

Dumet or 42 alloy is used suitably as the material of the lead wire 4. Copper (Cu), iron (Fe), chromium (Cr), nickel (Ni), aluminum (Al), zinc (Zn), titanium (Ti), or an alloy including at least one of these can be used as the material of the lead wire 4. The length of the lead wire 4 is usually 5 to 15 mm, which is selected considering the size of the protective case 2.

The sealing material 5 covers and protects the temperature-sensitive sintered body 3, and an insulating resin such as an epoxy resin having a high heat resistance temperature is used. Thus, the temperature-sensitive sintered body 3, etc. can be effectively protected even when it is used in a high temperature environment.

The packing resin 6 is packed around the temperature-sensitive sintered body 3 in the protective case 2. Specifically, the packing resin 6 is an acid anhydride-based epoxy resin, and is packed around the temperature-sensitive sintered body 3 and contains the sealing material 5 covering the temperature-sensitive sintered body 3 and a connection portion side of the lead wire 4 toward the temperature-sensitive sintered body 3. The packing resin 6 may include fillers such as ceramic, metal, and carbon having good heat conductivity.

Second Embodiment

Figure 2:
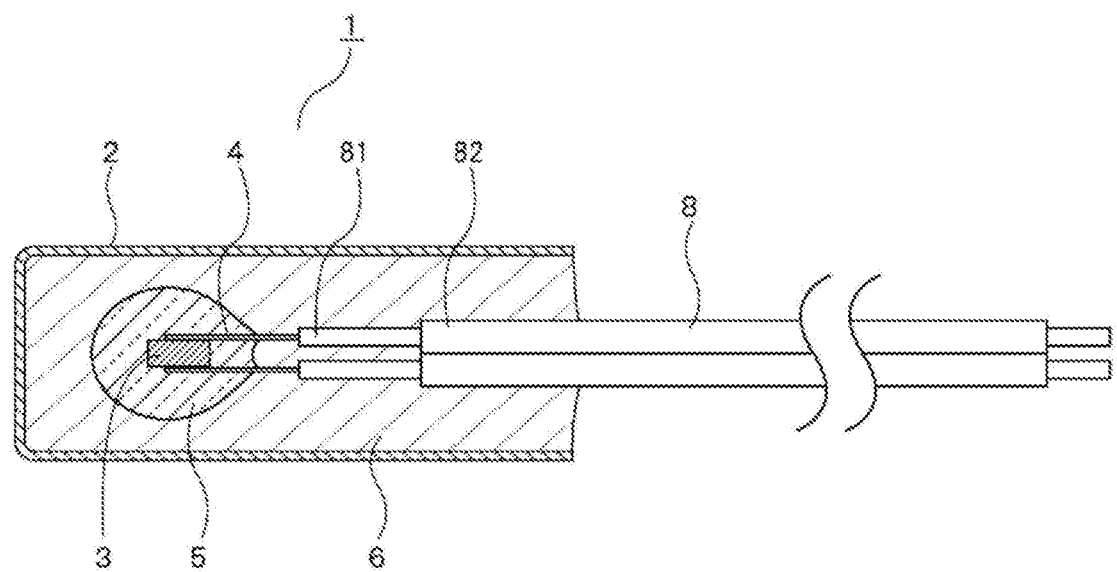
FIG. 2 is a cross-sectional view showing the temperature sensor according to the second embodiment of the disclosure.

As shown in FIG. 2, the temperature sensor 1 of the present embodiment has the same basic configuration as that of the first embodiment. Crystallized glass or the like is used as the sealing material 5 that covers and protects the temperature-sensitive sintered body 3. Thus, the temperature-sensitive sintered body 3, etc. can be effectively protected even when the temperature sensor 1 is used in a high temperature environment.

Third Embodiment

Figure 3:
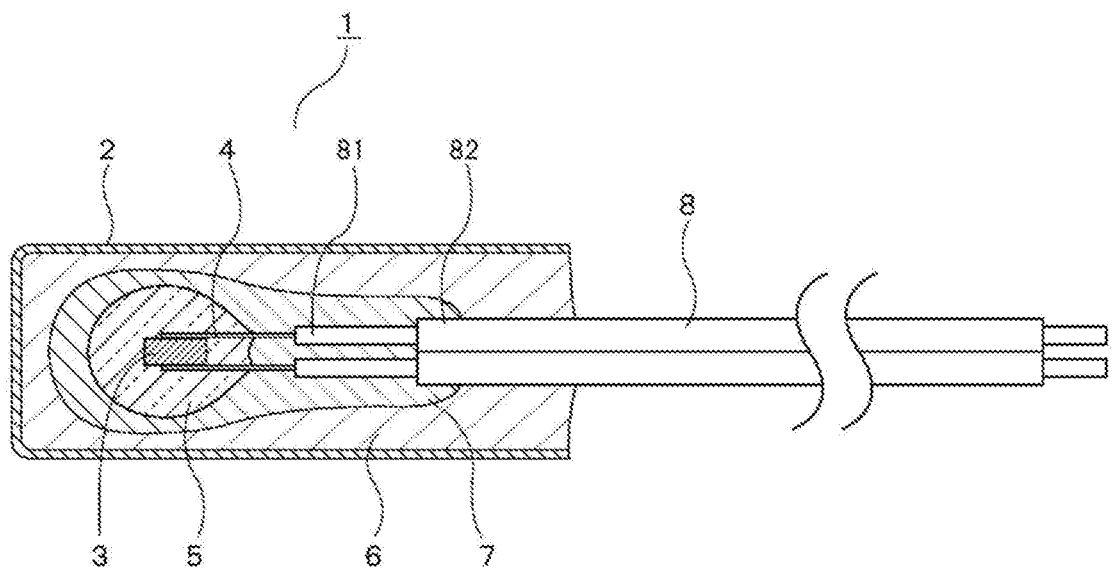
FIG. 3 is a cross-sectional view showing the temperature sensor according to the third embodiment of the disclosure.

As shown in FIG. 3, the temperature sensor 1 of the present embodiment has the same basic configuration as that of the first embodiment, but a dip resin 7 is disposed around the temperature-sensitive sintered body 3 to ensure insulation between the lead wire 4 and each electrically connected core wire 81. The dip resin 7 is disposed by dipping the temperature-sensitive sintered body 3 connected with the lead wire 4 into an insulating resin.

Fourth Embodiment

Figure 4:
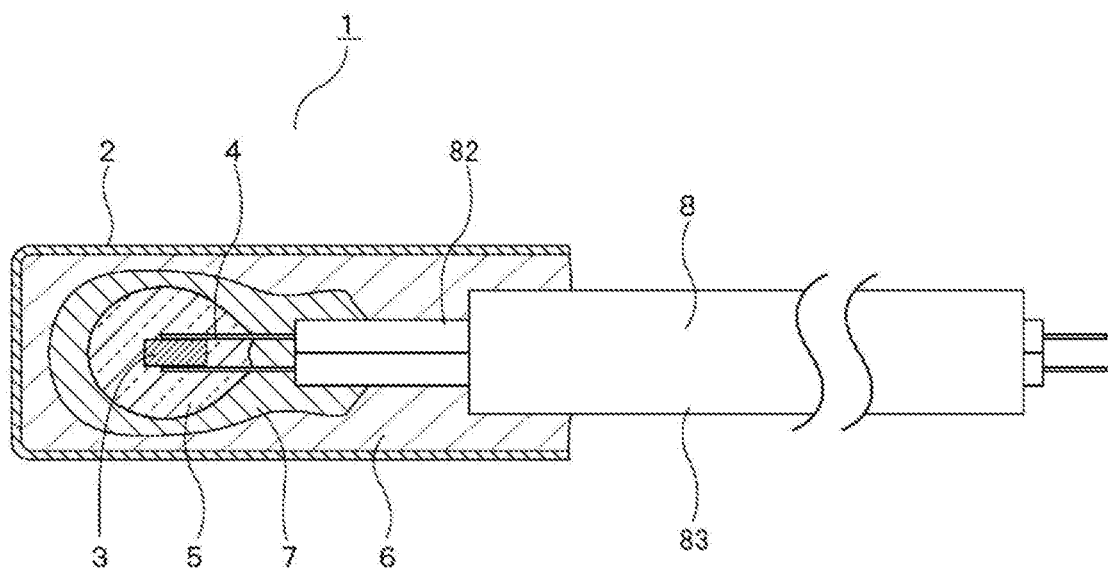
FIG. 4 is a cross-sectional view showing the temperature sensor according to the fourth embodiment of the disclosure.

As shown in FIG. 4, the temperature sensor 1 of the present embodiment has the same basic configuration as that of the first embodiment, but a dip resin 7 is disposed around the temperature-sensitive sintered body 3 to ensure insulation between the lead wire 4 and each electrically connected core wire 81. The dip resin 7 is disposed by dipping the temperature-sensitive sintered body 3 connected with the lead wire 4 into an insulating resin. Furthermore, the electric wire 8 is applied with a double insulating coating 83, and even if the core wire is thin as a double coating electric wire, practical insulation and tensile strength are obtained.

Next, the evaluation results obtained by performing a heat cycle test on the temperature sensor 1, basically configured as described above, will be described with reference to FIG. 5. The heat cycle test was carried out by repeatedly changing the temperature to −30° C. and 150° C. every 30 minutes.

As shown in FIG. 5, nine types of samples, No. 1 to No. 9, were prepared. For each sample, the materials and linear expansion coefficients of the components are shown. The components include the temperature-sensitive sintered body, the lead wire, the sealing material, the packing resin, and the protective case.

For example, in terms of sample No. 1, the "temperature-sensitive sintered body" is metal oxide ceramic and has a linear expansion coefficient of $10 \times 10^{-6}/°$ C., the "lead wire" is a round wire of Dumet and has a diameter of 0.2 mm and a linear expansion coefficient of $9 \times 10^{-6}/°$ C., the "sealing material" is glass and has a linear expansion coefficient of $8.8 \times 10^{-6}/°$ C., the "packing resin" is epoxy resin and hard and has a linear expansion coefficient of $13 \times 10^{-6}/°$ C., and the "protective case" is made of copper and has a linear expansion coefficient of $16.8 \times 10^{-6}/°$ C.

Besides, in terms of sample No. 3, the "temperature-sensitive sintered body" is metal oxide ceramic and has a linear expansion coefficient of $10 \times 10^{-6}/°$ C., the "lead wire" is a Dumet round wire and has a diameter of 0.2 mm and a linear expansion coefficient of $7 \times 10^{-6}/°$ C., the "sealing material" is glass and has a linear expansion coefficient of 8.8'3 $10^{-6}/°$ C., the "packing resin" is epoxy resin and hard and has a linear expansion coefficient of $13 \times 10^{-6}/°$ C., and the "protective case" is PPS with glass fillers and has a linear expansion coefficient of $11.0 \times 10^{-6}/°$ C. A very small linear expansion coefficient is chosen compared to the linear expansion coefficient of general PPS, which is $40 \times 10^{-6}/°$ C.

Further, in terms of sample No. 6, the "temperature-sensitive sintered body" is metal oxide ceramic and has a linear expansion coefficient of $10 \times 10^{-6}/°$ C., the "lead wire" is a 42 alloy quadrangular wire and has dimensions of 0.25×0.35 mm and a linear expansion coefficient of $5 \times 10^{-6}/°$ C., the "sealing material" is epoxy resin and has a linear expansion coefficient of $40 \times 10^{-6}/°$ C., the "packing resin" is epoxy resin and hard and has a linear expansion coefficient of $13 \times 10^{-6}/°$ C., and the "protective case" is made of copper and has a linear expansion coefficient of $16.8 \times 10^{-6}/°$ C. As to the other samples, similar to the above, the materials and linear expansion coefficients of the components are shown.

The results of performing the heat cycle test on such samples No. 1 to No. 10 are shown in the right column of FIG. 5. Specifically, measurement of the change in resistance value ΔR (%) with respect to the reference resistance value of the thermistor at 100 cycles, 1000 cycles, 5000 cycles, 10000 cycles, and 20000 cycles, and appearance observation are performed.

First, in terms of appearance observation, the protective case of sample No. 2 had cracks at 5000 cycles. For sample No. 8, the thermistor came out of the protective case together with the packing resin at 100 cycles. Similarly, for sample No. 9, the thermistor came out of the protective case together with the packing resin at 1000 cycles. It is considered that these failures are mainly caused by the large difference in linear expansion coefficient between the packing resin and the protective case. Therefore, the configurations of sample No. 2, sample No. 8, and sample No. 9 have poor durability against heat cycles.

Next, looking at the change in resistance value ΔR (%), at 100 cycles, the samples were ±0.01(%) and no change was observed. At 1000 cycles, sample No. 6-1 (another sample not shown in FIG. 5) was +4.2(%) and showed an extraordinary change rate compared to other samples. In addition, sample No. 8 was +2.3(%) at 10000 cycles and showed a large change rate. Such a large change rate is presumed to be damage in the temperature-sensitive sintered body.

Therefore, it can be seen that sample No. 1, sample No. 3, and sample No. 6 satisfy the appearance observation and the change in resistance value ΔR (%) and have good durability against heat cycles.

When realistically appropriate conditions are sorted out based on the conditions of the components of these samples, the linear expansion coefficient of the temperature-sensitive sintered body is 4.5 to $12 \times 10^{-6}/°$ C., the cross-sectional area of the lead wire is 0.097 mm² or less, the linear expansion coefficient of the packing resin is 7.5 to $19.5 \times 10^{-6}/°$ C., and the linear expansion coefficient of the protective case is 7.5 to $19.5 \times 10^{-6}/°$ C. The ranges of these linear expansion coefficients are considered based on the linear expansion coefficient of the temperature-sensitive sintered body.

Regarding the change in resistance value ΔR (%), it is considered that the cross-sectional area of the lead wire is highly related. As seen in the samples, in the case where the lead wire was a round wire having a diameter of 0.2 mm (sample No. 1 to sample No. 5), the cross-sectional area was about 0.0314 mm²; and in the case where the lead wire was a round wire having a diameter of 0.7 mm (sample No. 6-1), the cross-sectional area was about 0.3847 mm².

In the case of a quadrangular wire having a shape of 0.25×0.35 mm (sample No. 6), the cross-sectional area was about 0.0875 mm², and in the case of a quadrangular wire that was 0.5 mm on one side (sample No. 7 to sample No. 9), the cross-sectional area was about 0.25 mm².

The change in resistance value ΔR (%) tends to increase as the cross-sectional area of the lead wire increases, and for sample No. 6-1, the change in resistance value ΔR (%) changed greatly at 1000 cycles. For sample No. 7, the change in resistance value ΔR (%) changed greatly at 5000 cycles, 10000 cycles.

Therefore, it can be seen that if the cross-sectional area of the lead wire is as small as 0.097 mm² or less, the change in resistance value ΔR (%) can be suppressed. The reason is presumed to be that if the lead wire is thick and has a large cross-sectional area, the force applied to the temperature-sensitive sintered body increases. In addition, by making the lead wire thin and reducing the cross-sectional area, heat radiation from the lead wire is reduced and it is possible to carry out accurate temperature detection. In the case of using multiple lead wires, the cross-sectional areas of the lead wires can be grasped by the total cross-sectional area of the lead wires. Also, based on the above-mentioned appropriate conditions, a preferable range regarding the relationship between the material of the protective case and the linear expansion coefficient of the packing resin was examined.

In the case where the protective case was aluminum as in sample No. 4 and sample No. 5, the linear expansion coefficient was $23\times10^{-6}/°$ C. In this case, the change in resistance value ΔR (%) changed greatly at 10000 cycles. According to this result, it is desirable that the linear expansion coefficient of the protective case is $20\times10^{-6}/°$ C. or less. When a protective case that has a large thermal expansion as aluminum is used, it is presumed that compressive stress is applied to the temperature-sensitive sintered body and the temperature-sensitive sintered body is breaking.

On the other hand, when focusing on the packing resin, the linear expansion coefficient of the packing resin used for sample No. 1, sample No. 3, and sample No. 6 that have the smallest change in the change in resistance value ΔR (%) was $13\times10^{-6}/°$ C.

Considering the above results and the range 4.5 to $12\times10^{-6}/°$ C. of the linear expansion coefficient of the temperature-sensitive sintered body, the linear expansion coefficient of the protective case and the packing resin was set to the range of 7.5 to $19.5\times10^{-6}/°$ C., which is ±50% of $13\times10^{-6}/°$ C.

Conventionally, it is possible to provide a temperature sensor having excellent heat cycle resistance by setting the linear expansion coefficient of the packing resin to $30\times10^{-6}/°$ C. or less (see Patent Document 1). However, in the cycle test in the temperature range of −30° C. to 150° C., sample No. 4 having a linear expansion coefficient of $27\times10^{-6}/°$ C. had a large change in resistance value and an abnormal resistance value was generated. Further, as seen in sample No. 5, an abnormal resistance value occurred even if the linear expansion coefficient of the aluminum case was $23\times10^{-6}/°$ C.

As described above, according to the present embodiment, it is possible to provide the temperature sensor 1 that can not only prevent the failure that the temperature-sensitive sintered body 3 comes out of the protective case 2 together with the packing resin 6 but also curb changes in the properties of the temperature-sensitive sintered body 3 and ensure reliability.

In addition, the above-described temperature sensor 1 can be provided in various devices for detecting the temperatures of household electrical appliances such as air conditioners, refrigerators, and water heaters, or in-vehicle equipment for automobiles, etc. The devices to which the disclosure is applied are not particularly limited.

Nevertheless, the disclosure is not limited to the configurations of the above embodiments, and various modifications can be made without departing from the spirit of the disclosure. In addition, the above embodiments are presented as an example and are not intended to limit the scope of the disclosure. These novel embodiments can be implemented in various other forms, and various omissions, substitutions, and changes can be made. These embodiments and modifications thereof are included in the scope and spirit of the disclosure and are included in the disclosure defined in the claims and the scope equivalent thereto.

What is claimed is:

1. A temperature sensor, comprising:
a protective case having a linear expansion coefficient of 7.5 to $19.5\times10^{-6}/°$ C.;
a temperature-sensitive sintered body disposed in the protective case;
a lead wire connected to the temperature-sensitive sintered body and having a cross-sectional area of 0.097 mm² or less; and
a packing resin packed around the temperature-sensitive sintered body in the protective case and having a linear expansion coefficient of 7.5 to $19.5\times10^{-6}/°$ C.,
wherein the packing resin is in contact with an entire inner wall of the protective case,
the material of the protective case is resin and comprises a filler for improving heat conductivity.

2. The temperature sensor according to claim 1, wherein the resin of the protective case is polyphenylene sulfide, liquid crystal polymer, polyamide-imide, or polyetherimide.

3. The temperature sensor according to claim 1, wherein the lead wire is copper, iron, chromium, nickel, aluminum, zinc, titanium, or an alloy comprising at least one of these.

4. The temperature sensor according to claim 1, wherein the packing resin is an acid anhydride-based epoxy resin comprising a filler.

5. The temperature sensor according to claim 1, wherein the lead wire is a stranded wire and is configured as a core wire of an electric wire applied with an insulating coating.

6. The temperature sensor according to claim 5, wherein the insulating coating of the electric wire is a double coating.

7. A device provided with a temperature sensor comprising the temperature sensor according to claim 1.

* * * * *